Feb. 18, 1958    A. E. R. ARNOT    2,823,621
VEHICLE BATTERY REPLACER
Filed Feb. 7, 1955
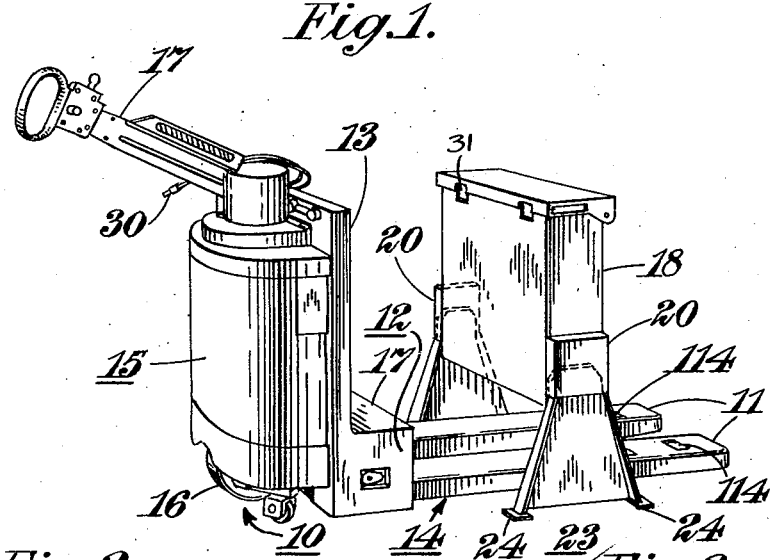
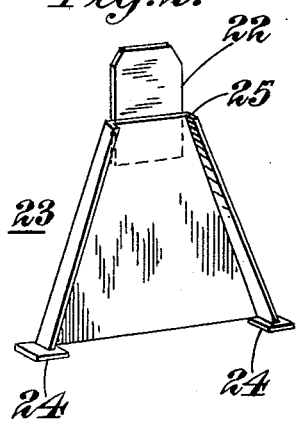
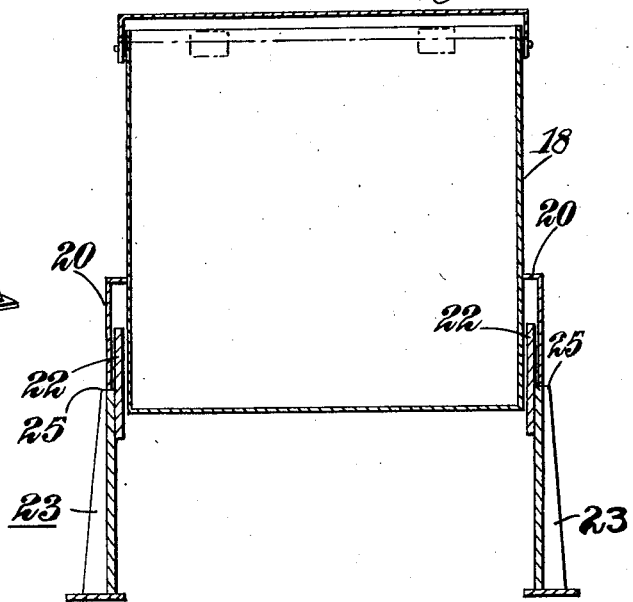
INVENTOR
Alfred E. R. Arnot
By Watson, Cole, Grindle & Watson
ATTORNEYS

United States Patent Office 2,823,621
Patented Feb. 18, 1958

2,823,621

VEHICLE BATTERY REPLACER

Alfred Erwin Reginald Arnot, Basingstoke, England, assignor to Emmanuel Kaye and John Reginald Sharp, Basingstoke, England Application February 7, 1955, Serial No. 486,650

Claims priority, application Great Britain February 8, 1954

1 Claim. (Cl. 104—34)

This invention comprises improvements in or relating to cases for electric storage batteries.

It is an object of the invention to provide a case for a storage battery on an electric truck such as a pallet truck. Pallet or stillage trucks are used for moving goods about a factory and are usually operated by a battery which is located on a chassis having forwardly projecting fork arms which can be brought beneath goods to be carried by advancing the truck towards a pallet or stillage on which the goods rest, after which the fork arms can be caused to rise relatively to the ground and so lift the goods for transportation.

The batteries are usually changed by taking the battery with its case off the truck and replacing it with a fresh one when the first battery has become discharged. Batteries, however, are very heavy and it is not convenient always to have to run the truck beneath lifting tackle for the purpose of changing batteries.

According to the present invention a truck of the kind described has in combination a removable battery case and carrying means therefor on the truck which permit removal of the battery by lifting it and moving the truck away from the battery case, and supporting legs for the battery case at each side thereof capable of being brought into use to support the battery case from the ground when the truck and battery are to be separated or brought together, the legs being so positioned when in use as to stand clear of the truck and permit the movement of the truck away from the battery case.

A feature of the invention is to provide a truck of the type described having a shelf portion to carry a removable battery case, which shelf portion is freely open on each side of the truck and is unobstructed in the fore or aft direction, and a battery case is provided to rest upon the shelf portion, which case has supporting legs capable of being brought into use for supporting the battery clear of the ground when the truck and battery are separated, the legs being sufficiently spaced apart to permit movement of the truck with its shelf beneath the battery case for the loading or unloading thereof.

Preferably the said supporting legs for the battery case are detachable therefrom when the battery case is on the said carrying means, and may be replaced for unloading the battery from the truck, and the said battery case carrying means or shelf portion is movable up and down with the truck load carrying member or members.

It is a further features of the invention to provide a flexible cable to conduct power from the battery to the truck before the battery is in the carrying means.

The following is a description by way of example of one construction in accordance with the invention reference being made to the accompanying drawings in which:

Figure 1 is a perspective view of a truck entered beneath a battery case mounted on its supporting legs, the forks of the truck being in the lowered position;

Figure 2 is a perspective view of a supporting leg removed from the battery casing; and Figure 3 is a cross-sectional elevation showing the battery casing mounted on its legs.

A truck 10 is provided consisting of two forwardly extending horizontal fork-arms 11 which are united at their rear end by a cross frame 12 and carry at this end a strong upstanding back plate 13. The fork arms 11 are hollow and they carry at their forward ends pivoted cradles (not shown) on which are mounted rollers 114 for lifting the front ends of the fork arms 11 in known manner. The cradles can be actuated by rods (not shown) extending longitudinally through the underneath part of the fork arms. The vertical back plate 13 of the front part of the chassis 14 is connected by links (not shown) to a rear part of the chassis 15 which carries a turntable (not shown). The turntable is supported upon a truck-wheel 16 and the truck-wheel 16 is capable of being driven by an electric motor (not shown) mounted on the turntable. The turntable permits the driven wheel 16 to be steered and a tiller steering member 17 is attached to it for this purpose. Power means (not shown) for operating the links between the front and rear parts of the truck and for simultaneously operating the rods in the fork arms 11 are provided, so that when desired the forked portion of the truck can be lifted relatively to the turntable. In this way it is possible for the truck 10 to be driven beneath a pallet while the fork arms are in their lowest position and then for the pallet, and any goods which are upon it, to be lifted by raising the fork arms 11 relatively to the rest of the truck.

On the forked portion of the chassis in front of the back plate 13 there is a shelf 17 for a battery. This shelf is open, that is to say it is without any sides, at the left and right of the truck 10 and it is located close to the back plate 13 between the back plate 13 and the forked portion which extends forwardly therefrom.

A battery case 18 for mounting on the battery shelf is made of stout sheet metal and on each side it carries welded-on side members 20 comprising socket members adapted to receive a cooperating vertical spigot plate 22 of a battery carrying leg 23. When the legs are in position they are sufficiently far apart to engage the ground outside each of the fork arms. The legs taper outwardly from their spigot plates and have two feet 24 at their lower ends.

The battery case 18 is supported on the legs 23, the side member 20 resting on the ledges 25 of the legs 23. To load the battery case 18 onto the battery shelf 17 the truck 10 is inserted between the legs 23 until the battery shelf 17 lies directly beneath the battery case. The fork arms 11 and the battery shelf 17 which they carry, are then lifted relatively to the turntable carrying part of the chassis 15 so as to support the weight of the battery case and the legs 23 are removed from the side members 20 of the battery case 18.

To unload the battery case the legs 23 are inserted in the side members 20 of the battery case 18 and the battery shelf 17 and fork arms 11 are lowered until the weight of the battery case 18 is taken by the legs 23, the truck is then withdrawn rearwardly from beneath the battery case 18 which is left standing on the ground on its legs 23.

By having a flexible cable 30 which cooperates with socket 31 to connect the battery terminals to the driving and lifting motors, the withdrawal of the truck 10 can be accomplished under its own power. It can then be advanced under another battery by connecting the flexible cable from the other battery to the turntable motor, and upon raising the battery shelf again the new battery will be lifted from the ground. The front of the battery box is made of stout sheet metal which will withstand the shocks of impact with goods and pallets carried on the fork arms.

I claim:

The combination of a battery driven pallet truck, comprising in combination, a wheeled truck body, a vertically movable member having two forwardly extending fork arms and a support means mounted on said truck body, said support means comprising a horizontal shelf open on either side and forwardly thereof and extending in a horizontal plane above the plane of said fork arms and positioned at the rear of said fork arms, a storage battery case and storage battery mounted therein, said battery case being supported on said shelf such that said battery is in operative relationship to said truck, terminals connecting the power source of said truck to said battery, said battery case having a width greater than the distance between the outer edges of said fork arms and having on either end thereof a socket element such that said socket elements are positioned to the outside of said fork arms when said battery case is in place on said shelf, and an auxiliary support means comprising two upstanding support members spaced from one another a distance slightly greater than the width of said battery case, each said support member having a spigot element upstanding therefrom, said spigot elements adapted to enter into said socket elements when said auxiliary support means is appropriately positioned relative to said truck and said vertically movable member is lowered such that said auxiliary support means carries said battery case in sole supporting relationship and, when said battery case is so carried by said auxiliary support means and the terminals are disconnected from said battery, said truck may be moved away from said battery case.

References Cited in the file of this patent

UNITED STATES PATENTS

| | | |
|---|---|---|
| 1,122,686 | Clark | Dec. 29, 1914 |
| 1,506,849 | Mancha | Sept. 2, 1924 |
| 1,575,699 | Mancha | Mar. 9, 1926 |
| 1,764,355 | Schellentrager et al. | June 17, 1930 |
| 1,851,727 | Ponsonby | Mar. 29, 1932 |
| 2,432,182 | Turner | Dec. 9, 1947 |
| 2,513,718 | Gfrorer | July 4, 1950 |
| 2,517,304 | Greening | Aug. 1, 1950 |
| 2,645,297 | Wennberg et al. | July 14, 1953 |